(12) United States Patent
Smith, Sr. et al.

(10) Patent No.: US 7,108,910 B1
(45) Date of Patent: Sep. 19, 2006

(54) DOUBLE SIDED ADHESIVE CARPET TAPE

(76) Inventors: Donald R. Smith, Sr., 95 Young St., Easton, PA (US) 18042; Kenneth D. Bond, 411 E. Main St., Bath, PA (US) 18014

( * ) Notice: Subject to any disclaimer, the term of this patent is extended or adjusted under 35 U.S.C. 154(b) by 73 days.

(21) Appl. No.: 10/303,248

(22) Filed: Nov. 25, 2002

(51) Int. Cl.
  *C09J 7/02* (2006.01)
  *B32B 3/00* (2006.01)

(52) U.S. Cl. ............... 428/354; 428/40.1; 428/343; 428/347; 428/349; 428/57; 428/97; 219/245; 156/304.4

(58) Field of Classification Search ........... 428/40.1, 428/343, 347, 349, 354, 57, 97; 219/245; 156/304.4
See application file for complete search history.

(56) References Cited

U.S. PATENT DOCUMENTS

| | | | | |
|---|---|---|---|---|
| 3,533,876 A | * | 10/1970 | Burgess | 156/304 |
| 4,416,713 A | | 11/1983 | Brooks | 156/64 |
| 5,104,475 A | * | 4/1992 | Foster et al. | 156/304.3 |
| 5,198,300 A | | 3/1993 | Matthews et al. | 428/354 |
| 5,376,419 A | | 12/1994 | Foster et al. | 428/40 |
| 5,384,001 A | | 1/1995 | Hoopengardner | 156/391 |
| 5,693,171 A | | 12/1997 | Foster et al. | 156/304.4 |

OTHER PUBLICATIONS

Quick Stix 100 MDS, info gleaned from their website; XL Flooring, 237 Nance Rd., NE, Calhoun, GA, 30701; 800-FOR-GLUE.
3M Adhesive Technology Designer's Reference Guide: 3M Fastbond and Scotch Grip Contact Adhesives, p. 18.

* cited by examiner

*Primary Examiner*—Daniel Zirker
(74) *Attorney, Agent, or Firm*—Sturm & Fix LLP

(57) ABSTRACT

A carpet tape construction 10 designed for use on top of a layer of padding 100 and beneath the abutting edges of two segments of carpet 200 which form a seam 203 to prevent the peaking of the seam 203 in a finished carpet installation. The tape construction 10 includes a tape backing member 30 having a coating 50, hot melt adhesive provided on surface top 31 and a heat activated contact adhesive 60 on the bottom 32 surface of the backing member 30 so that the hot melt adhesives 50, an heat activated contact adhesive 60 will penetrate and bond the carpet segments 200, 200 and the padding 100 to the backing member 30.

2 Claims, 1 Drawing Sheet

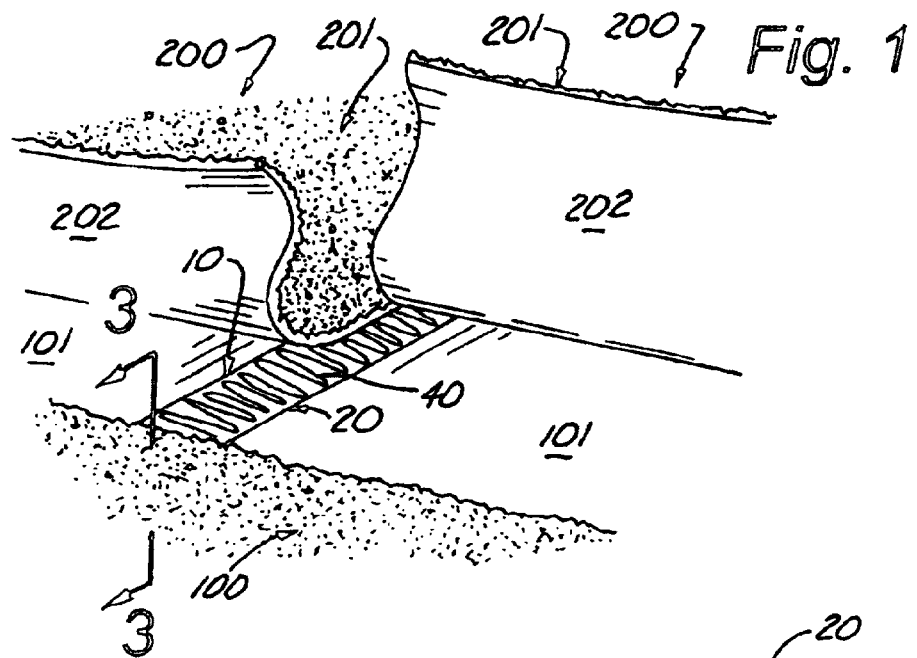
Fig. 1
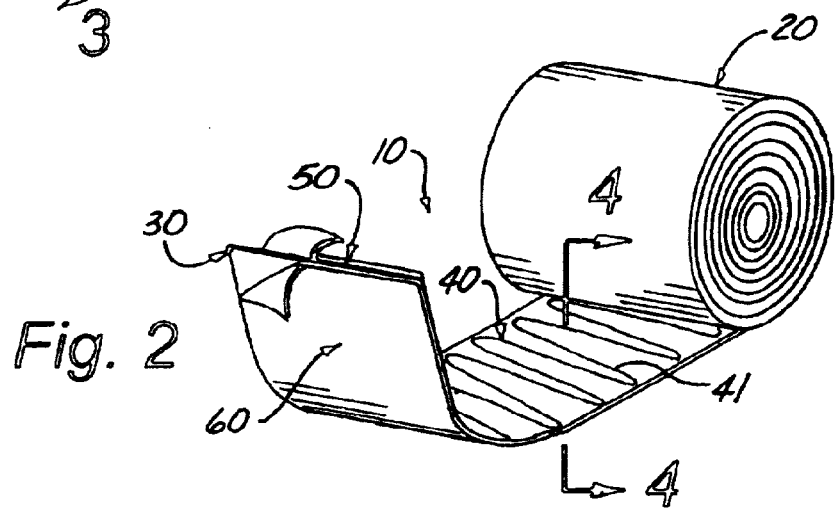
Fig. 2
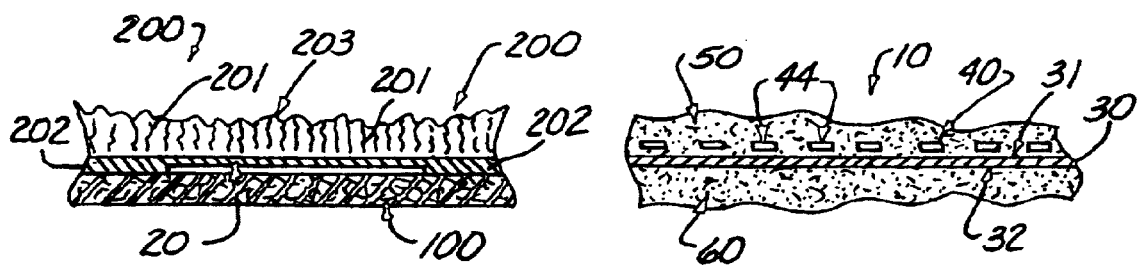
Fig. 3
Fig. 4

DOUBLE SIDED ADHESIVE CARPET TAPE

BACKGROUND OF THE INVENTION

1. Field of the Invention

The present invention relates to the field of carpet seam sealing systems in general, and in particular to a double sided hot melt adhesive carpet tape that prevents carpet seams from peaking.

2. Description of Related Art

As can be seen by reference to the following U.S. Pat. Nos. 5,198,300; 5,384,001; 4,416,713; 5,376,419; and 5,693,171, the prior art is replete with myriad and diverse carpet seam sealing tapes including at least one patent that employs an adhesive coating on both sides of the tape backing.

It should be noted that while U.S. Pat. No. 5,376,419 employs a hot melt adhesive on the top surface of the tape, it specifically calls for the use of a pressure sensitive adhesive on the bottom surface of the tape and this arrangement is specifically designed for a "glue down" carpet installation. The carpet is directly adhered to the floor as opposed to a layer of padding which rests upon the floor.

It should be noted that for the purpose of this invention, the term "pressure sensitive" is to be interpreted as a "releasable" or "non-permanent" adhesive such as is employed on duct tape, Scotch brand tape, Post-It notepaper or H.B. Fuller Co., adhesive #HM8340.

Furthermore, again for the purposes of this invention, a "heat activated contact adhesive" is to be understood to be a "permanent" adhesive such as is used to adhere Formica to a counter top, glue carpet to a pole or vinyl reducers to a floor such as XL Corporation's QUICK STICK™ or 3M Corporation's HIGH STRENGTH 96.

While all of the aforementioned prior art constructions are more than adequate for the basic purpose and function for which they have been specifically designed, they are uniformly deficient with respect to their failure to provide a simple, efficient, and practical double sided hot melt adhesive carpet tape that is specifically designed for use with carpet padding as opposed to conventional glue down carpet installations wherein the carpet is directly adhered to a rigid substrate such as a floor or the like. The hot melt adhesive will penetrate both the carpet backing above the tape backing layer and the heat activated contact adhesive will penetrate the porous padding surface below the tape backing to create a secure bond between the carpet padding and the carpet backing that will eliminate the peaking effect at the carpet seam.

As a consequence of the foregoing situation, there has existed a longstanding need for a new and improved double sided hot melt adhesive carpet tape that is specifically designed to be used in conjunction with carpet padding to prevent carpet seam peaking, and the provision of such a construction is a stated objective of the present invention.

BRIEF SUMMARY OF THE INVENTION

Briefly stated, the carpet tape construction that forms the basis of the present invention comprises in general an elongated strip of carpet tape including a tape backing member having a reinforced top surface provided with a coating of hot melt adhesive and a bottom surface provided with a spray coating of heat activated contact adhesive.

As will be explained in greater detail further on in the specification, the carpet tape construction of this invention differs from other conventional carpet tape constructions in that it is specifically designed to be used in carpet installations that deploy carpet padding beneath the joined carpet segments, and due to the fact that the tape backing has a layer of hot melt adhesive provided on its top, and a spray applied and dried contact adhesive on the bottom surface. The hot melt adhesive and contact adhesive will penetrate the bottom of the carpet backing and the top of the carpet padding respectively to form an extremely secure seal between the respective components once the hot melt adhesive and the heat activated contact adhesive have cured.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the carpet tape construction disposed on top of a layer of carpet padding prior to joining two adjacent carpet segments;

FIG. 2 is a perspective view of the carpet tape construction being unrolled;

FIG. 3 is a cross sectional view taken through line 3—3 of FIG. 1; and

FIG. 4 is a cross section view taken through line 4—4 of FIG. 2.

DETAILED DESCRIPTION OF THE INVENTION

As can be seen by reference to the drawings, and in particular to FIGS. 1 and 2, the tape construction that forms the basis of the present invention is designated generally by the reference number 10. The tape construction 10 comprises in general, an elongated strip of carpet tape 20 which includes a tape backing member 30, a reinforcement member 40, and adhesive coatings 50 and 60.

As can best be seen by reference to FIGS. 2 and 4, the tape backing member 30 has a top surface 31 and a bottom surface 32. The backing member 30 may comprise either heavy gauge paper in the conventional manner.

As can also be seen by reference to FIGS. 2 and 4, the top surface 31 of the tape backing member 30 is provided with a reinforcement member 40 in the form of an elongated strand 41 of nylon, mono-filament line, or the like which is adhesively secured to the top surface 31 of the tape backing member 30 in a generally sinusoidal pattern to provide a degree of rigidity and support to the tape backing member 40 in a well recognized fashion.

Turning now to FIGS. 1 and 3, it can be seen that the strip of carpet tape 20 is intended to be employed on the top surface 101 of a layer of carpet padding 100 such that the tape construction 10 is disposed beneath the seam 203 of two generally identical adjacent segments of carpet 200. Each segment of carpet 200 has a textured surface 201 which is anchored by an underlying layer of carpet backing 202 in a well recognized fashion.

Once the strip of carpet tape 20 has been properly positioned relative to the layer of carpet padding 100 and the abutting edges of the segments of carpet 200, 200 that form a carpet seam 203, heat is applied along both sides of the carpet seam 203 to melt the coatings 50 and heat activates the contact adhesive 60 on the top 31 and bottom 32 surfaces, respectively, of the tape backing member 30.

As the coatings 50 and 60 liquify under the influence of the heat, adhesive, coating 60 will penetrate the top surface 101 of the layer of carpet padding 100 while adhesive coating 50 will simultaneously penetrate the bottom surface of the carpet backing 202 in a well recognized fashion.

Then once the hot melt adhesive coatings 50 and the spray coated heat activated contact adhesive 60 have cooled and solidified, a generally permanent bond will be created between the tape construction 10, the padding member 100, and the area proximate the seam 203 of the adjacent segments of carpet 200.

At this juncture, the "kicking or stretching" phase of the carpet installation can commence in the normal fashion and the installed carpet will not be subject to the seam peaking that would be encountered with the prior art carpet seaming tapes.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A carpet tape construction comprising:

an elongated strip of carpet tape including a tape backing member having a top surface provided with a coated of hot melt adhesive and a bottom surface provided with a coating of heat activated contact adhesive; and, a reinforcement member operatively associated with the top surface of the backing member, said reinforcement member comprising at least one elongated strand of line adhesively secured to the top surface of the tape backing and arrayed in a generally sinusoidal pattern.

2. A carpet seam comprising tape construction in combination with a layer of padding and two segments of carpet that are abutted together to create seam wherein the tape construction consists of:

an elongated strip of carpet tape including a tape backing member having a top surface and a bottom surface wherein the top surface has a coating of hot melt adhesive and the bottom surface has a coating of heat activated contact adhesive; and, a reinforcement member operatively associated with the top surface of the backing member, said reinforcement member comprising at least on elongated strand of line adhesively secured to the top surface of the tape backing and arrayed in a generally sinusoidal pattern.

* * * * *

UNITED STATES PATENT AND TRADEMARK OFFICE
CERTIFICATE OF CORRECTION

PATENT NO.         : 7,108,910 B1  
APPLICATION NO. : 10/303248  
DATED              : September 19, 2006  
INVENTOR(S)        : Donald R. Smith, Sr. and Kenneth D. Bond Page 1 of 1

It is certified that error appears in the above-identified patent and that said Letters Patent is hereby corrected as shown below:

Column 1, line 34, "96" should be --90--

Column 4, line 3, "coated" should be --coating--

Column 4, line 26, "on" should be --one--

Signed and Sealed this

Sixth Day of February, 2007

JON W. DUDAS  
*Director of the United States Patent and Trademark Office*